(12) United States Patent
Liu et al.

(10) Patent No.: US 9,788,019 B2
(45) Date of Patent: Oct. 10, 2017

(54) METHOD AND APPARATUS OF TRANSFORM UNIT PARTITION WITH REDUCED COMPLEXITY

(75) Inventors: Shan Liu, San Jose, CA (US); Zhi Zhou, San Jose, CA (US); Shaw-Min Lei, Hsin-chu (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 896 days.

(21) Appl. No.: 13/156,552

(22) Filed: Jun. 9, 2011

(65) Prior Publication Data

US 2012/0230411 A1 Sep. 13, 2012

Related U.S. Application Data

(60) Provisional application No. 61/450,720, filed on Mar. 9, 2011, provisional application No. 61/452,547, filed on Mar. 14, 2011.

(51) Int. Cl.
*H04N 11/02* (2006.01)
*H04N 19/96* (2014.01)
*H04N 19/176* (2014.01)
*H04N 19/70* (2014.01)
*H04N 19/119* (2014.01)

(52) U.S. Cl.
CPC ........... *H04N 19/96* (2014.11); *H04N 19/119* (2014.11); *H04N 19/176* (2014.11); *H04N 19/70* (2014.11)

(58) Field of Classification Search
CPC ....... H04N 19/00072; H04N 19/00969; H04N 19/00278; H04N 19/00884
USPC ........................ 375/240.01–240.29
See application file for complete search history.

(56) References Cited

U.S. PATENT DOCUMENTS

| 6,031,872 A | 2/2000 | Han |
| 8,208,742 B2 * | 6/2012 | Cheon ........................... 382/232 |
| 2003/0156648 A1 | 8/2003 | Holcomb et al. |

(Continued)

FOREIGN PATENT DOCUMENTS

| CN | 1241094 A | 1/2000 |
| WO | 2010039822 A2 | 4/2010 |

OTHER PUBLICATIONS

JCTVC-E603, authored by Wiegand et. al., entitled "WD1: Working Draft 1 of High-Efficiency Video Coding", Joint Collaborative Team on Video Coding (JCT-VC) of ITU-T SG16 WP3 and ISO/IEC JTC1/SC29/WG11, 5th Meeting: Geneva, CH, Mar. 16-23, 20110.

(Continued)

*Primary Examiner* — Leron Beck
(74) *Attorney, Agent, or Firm* — McClure, Qualey & Rodack, LLP

(57) ABSTRACT

Transform unit (TU) partition method and apparatus depending on the coding unit (CU) partition and prediction unit (PU) partition are disclosed. In one embodiment, the maximum TU size is restricted to the minimum of PU width and height, except for a 2N×2N coding unit with the 2N×2N partition type. In another embodiment, the maximum TU size equals to maximum of PU width and height, and the minimum TU size equals to minimum of the PU width and height, except for a 2N×2N coding unit with the 2N×2N partition type. In yet another embodiment, the maximum TU size is equal to the maximum of PU width and height, and the minimum TU size is equal to the minimum of PU width and height except for a 2N×2N CU with 2N×2N partition type.

12 Claims, 6 Drawing Sheets

2Nx2N

2NxN

Nx2N

NxN

(56) References Cited

U.S. PATENT DOCUMENTS

2006/0125956 A1    6/2006  Lee
2010/0086049 A1*  4/2010  Ye et al. .................. 375/240.16
2011/0249743 A1*  10/2011  Zhao et al. ............. 375/240.16
2012/0106629 A1*  5/2012  Zheng et al. ........... 375/240.02

OTHER PUBLICATIONS

PCT Notification of Transmittal of the International Search Report and the Written Opinion of the International Search Authority, or the Declaration, PCT/CN2011/078149, mailing date: Nov. 17, 2011.
PCT International Search Report, PCT/CN2011/078149, dated Nov. 17, 2011.
PCT Written Opinion of the International Search Authority, PCT/CN2011/078149, dated Nov. 17, 2011.
"Test Model under Consideration;" Joint Collaborative Team on Video Coding (JCT-VC) of ITU-T SG15 WP3 and ISO/IEC JTC1/SC29/WG11; Apr. 2010; pp. 1-113.

\* cited by examiner

| | Descriptor |
|---|---|
| transform_tree( x0, y0, log2TrafoSize, trafoDepth, blkIdx ) { | |
|   if (trafoDepth == 0 && IntraSplitFlag == 0){ | |
|     if( !entropy_coding_mode_flag && PredMode != MODE_INTRA ) { | |
|       cbp_yuv_root | vlc(n,v) |
|       cbf_luma[ x0 ][ y0 ] [trafoDepth ] = cbp_yuv_root & 1 | |
|       cbf_cb[x0][y0] [trafoDepth ] = (cbp_yuv_root >> 1) & 1 | |
|       cbf_cr[x0][y0] [trafoDepth ] = (cbp_yuv_root >> 2) & 1 | |
|       residualDataPresentFlag = (cbp_yuv_root != 0) | |
|     } | |
|     else { | |
|       if( PredMode != MODE_INTRA ) | |
|         no_residual_data_flag | u(1) \| ae(v) |
|       residualDataPresentFlag = !no_residual_data_flag | |
|     } | |
|   } | |
|   else { | |
|     residualDataPresentFlag = TRUE | |
|   } | |
|   if ( residualDataPresentFlag) { | |
|     intraSplitFlag = ( IntraSplitFlag && trafoDepth == 0 ? 1 : 0 ) | |
|     maxDepth = ( PredMode == MODE_INTRA ?<br>        max_transform_hierarchy_depth_intra + IntraSplitFlag :<br>        max_transform_hierarchy_depth_inter ) | |
|     if( log2TrafoSize <= Log2MaxTrafoSize &&<br>      log2TrafoSize > Log2MinTrafoSize &&<br>      trafoDepth < maxDepth && !intraSplitFlag ) | |
|       split_transform_flag[ x0 ][ y0 ][ trafoDepth ] | u(1) \| ae(v) |
|     if( PredMode != MODE_INTRA &&<br>      log2TrafoSize <= Log2MaxTrafoSize &&<br>      entropy_coding_mode_flag ) { | |
|       firstChromaCbf = ( log2TrafoSize == Log2MaxTrafoSize \|\|<br>        trafoDepth == 0 ? 1 : 0) | |
|       if( firstChromaCbf \|\| log2TrafoSize > Log2MinTrafoSize ) { | |
|         xBase = x0 − ( x0 & ( ( 1 << log2TrafoSize ) − 1 ) ) | |
|         yBase = y0 − ( y0 & ( ( 1 << log2TrafoSize ) − 1 ) ) | |
|         if( firstChromaCbf \|\|<br>          cbf_cb[ xBase ][ yBase ][ trafoDepth − 1 ] ) | |
|           cbf_cb[ x0 ][ y0 ][ trafoDepth ] | u(1) \| ae(v) |

*Fig. 2A*

| | |
|---|---|
| if( firstChromaCbf ||<br>cbf_cr[ xBase ][ yBase ][ trafoDepth − 1 ] ) | |
| cbf_cr[ x0 ][ y0 ][ trafoDepth ] | u(1) | ae(v) |
| } | |
| } | |
| if( split_transform_flag[ x0 ][ y0 ][ trafoDepth ] ) { | |
| x1 = x0 + ( ( 1 << log2TrafoSize ) >> 1 ) | |
| y1 = y0 + ( ( 1 << log2TrafoSize ) >> 1 ) | |
| transform_tree( x0, y0, log2TrafoSize − 1, trafoDepth + 1, 0 ) | |
| transform_tree( x1, y0, log2TrafoSize − 1, trafoDepth + 1, 1 ) | |
| transform_tree( x0, y1, log2TrafoSize − 1, trafoDepth + 1, 2 ) | |
| transform_tree( x1, y1, log2TrafoSize − 1, trafoDepth + 1, 3 ) | |
| } | |
| else if( entropy_coding_mode_flag ){ | |
| if( PredMode == MODE_INTRA || trafoDepth != 0 ||<br>cbf_cb[ x0 ][ y0 ][ trafoDepth ] ||<br>cbf_cr[ x0 ][ y0 ][ trafoDepth ] ) | |
| cbf_luma[ x0 ][ y0 ][ trafoDepth ] | u(1) | ae(v) |
| if( PredMode == MODE_INTRA ) | |
| if( log2TrafoSize > Log2MinTrafoSize ) { | |
| cbf_cb[ x0 ][ y0 ][ trafoDepth ] | u(1) | ae(v) |
| cbf_cr[ x0 ][ y0 ][ trafoDepth ] | u(1) | ae(v) |
| } else if( blkIdx == 0 ) { | |
| cbf_cb[ x0 ][ y0 ][ trafoDepth − 1 ] | u(1) | ae(v) |
| cbf_cr[ x0 ][ y0 ][ trafoDepth − 1 ] | u(1) | ae(v) |
| } | |
| } | |
| } | |
| if( !entropy_coding_mode_flag && PredMode == MODE_INTRA) { | |
| cbp_yuv_root | vlc(n,v) |
| cbf_luma[ x0 ][ y0 ] [ 0 ] = cbp_yuv_root & 1 | |
| cbf_cb[x0][y0] [ 0 ] = (cbp_yuv_root >> 1) & 1 | |
| cbf_cr[x0][y0] [ 0 ] = (cbp_yuv_root >> 2) & 1 | |
| } | |
| } | |

*Fig. 2B*

| transform_tree( x0, y0, log2TrafoSize, trafoDepth, blkIdx ) { | Descriptor | |
|---|---|---|
| ... | | } 310 |
| if ( residualDataPresentFlag) { | | |
| split_transform_flag = 1 | | |
| if(trafoDepth==0 && PartMode==PART_2Nx2N ) { | | |
| split_transform_flag | u(1) \| ae(v) | |
| if( PredMode != MODE_INTRA) { | | 320 |
| coded_block_flag_cb[ x0 ][ y0 ][ trafoDepth ] | u(1) \| ae(v) | |
| coded_block_flag_cr[ x0 ][ y0 ][ trafoDepth ] | u(1) \| ae(v) | |
| } | | |
| if(trafoDepth==0 && split_transform_flag ) { | | |
| x1 = x0 + ( ( 1 << log2TrafoSize ) >> 1 ) | | |
| y1 = y0 + ( ( 1 << log2TrafoSize ) >> 1 ) | | |
| transform_tree( x0, y0, log2TrafoSize − 1, trafoDepth + 1, 0 ) | | 330 |
| transform_tree( x1, y0, log2TrafoSize − 1, trafoDepth + 1, 1 ) | | |
| transform_tree( x0, y1, log2TrafoSize − 1, trafoDepth + 1, 2 ) | | |
| transform_tree( x1, y1, log2TrafoSize − 1, trafoDepth + 1, 3 ) | | |
| } | | |
| else { | | |
| if( PredMode == MODE_INTRA) { | | |
| coded_block_flag_luma[ x0 ][ y0 ][ trafoDepth ] | u(1) \| ae(v) | |
| if( log2TrafoSize > Log2MinTrafoSize ) { | | |
| coded_block_flag_cb[ x0 ][ y0 ][ trafoDepth ] | u(1) \| ae(v) | |
| coded_block_flag_cr[ x0 ][ y0 ][ trafoDepth ] | u(1) \| ae(v) | 340 |
| } else if( blkIdx == 0 ) { | | |
| coded_block_flag_cb[ x0 ][ y0 ][ trafoDepth − 1 ] | u(1) \| ae(v) | |
| coded_block_flag_cr[ x0 ][ y0 ][ trafoDepth − 1 ] | u(1) \| ae(v) | |
| } | | |
| } | | |

*Fig. 3A*

| | |
|---|---|
| else { | |
| if(trafoDepth != 0 \|\| coded_block_flag_cb[x0][y0][ trafoDepth ] \|\| coded_block_flag_cr[ x0 ][ y0 ][ trafoDepth ] ) | |
| coded_block_flag_luma[ x0 ][ y0 ][ trafoDepth ] | u(1) \| ae(v) |
| if(trafoDepth != 0&&coded_block_flag_cb[xBase][yBase][trafoDepth − 1] ) | |
| coded_block_flag_cb[ x0 ][ y0 ][ trafoDepth ] | u(1) \| ae(v) |
| if(trafoDepth!=0&&coded_block_flag_cr[xBase][yBase][trafoDepth − 1] ) | |
| coded_block_flag_cr[ x0 ][ y0 ][ trafoDepth ] | u(1) \| ae(v) |
| } | |
| } | |
| } | |
| } | |

350 (bracket spanning the coded_block_flag rows)

*Fig. 3B*

| transform_tree( x0, y0, log2TrafoSize, trafoDepth, blkIdx )  { | Descriptor |
|---|---|
| ... | |
| if ( residualDataPresentFlag)  { | |
| split_transform_flag = 1 | |
| if(trafoDepth==0 && PartMode!=PART_NxN ) { | |
| split_transform_flag | u(1) \| ae(v) |
| if( PredMode  !=   MODE_INTRA) { | |
| coded_block_flag_cb[ x0 ][ y0 ][ trafoDepth ] | u(1) \| ae(v) |
| coded_block_flag_cr[ x0 ][ y0 ][ trafoDepth ] | u(1) \| ae(v) |
| } | |
| ... | |
| } | |
| } | |

Rows bracketed: first two data rows → 410; remaining block → 420.

*Fig. 4*

METHOD AND APPARATUS OF TRANSFORM UNIT PARTITION WITH REDUCED COMPLEXITY

CROSS REFERENCE TO RELATED APPLICATIONS

The present invention claims priority to U.S. Provisional Patent Application, Ser. No. 61/450,720, filed Mar. 9, 2011, entitled "Syntax for transform unit in HEVC", U.S. Provisional Patent Application, Ser. No. 61/452,547, filed Mar. 14, 2011, entitled "Optimization for Merge Mode Decision", and U.S. patent application Ser. No. 13/156,552, filed Jun. 9, 2011, entitled "Method and Apparatus of Transform Unit Partition with Reduced Complexity". The above Patent Applications are hereby incorporated by reference in their entireties.

TECHNICAL FIELD

The present invention relates to video coding. In particular, the present invention relates to coding techniques associated with the transform unit partition and optimization of merge mode decision.

BACKGROUND

High Efficiency Video Coding (HEVC) is a video coding standard under development with the goal to achieve additional 50% bit-rate reduction over the existing H.264/AVC standard. HEVC is block-based hybrid video coding with very flexible block structure. Three block concepts are introduced in HEVC: coding unit (CU), prediction unit (PU), and transform unit (TU). The overall coding structure is characterized by the various sizes of CU, PU and TU in a recursive fashion, where each picture is divided into largest CUs (LCUs) consisting of 64×64 pixels. Each LCU is then recursively divided into smaller CUs until leaf CUs or smallest CUs are reached. Once the CU hierarchical tree is done, each leaf CU is subject to further split into prediction units (PUs) according to partition type. Furthermore, transform is applied to TUs to transform the spatial data into transform coefficients for compact data representation.

For transform processing in current HEVC, a hierarchy RQT (Residual Quad Tree) is used. The TU size is related to the CU size, but is independent of the PU size. Since the TU partition is independent of the PU partition and the maximum allowed TU depth, i.e., max RQT depth, is 3, the current syntax for residual quad tree, transform_tree( ), is quite complicated. This results in high encoding complexity and also causes increased time for processing the residual quad tree syntax. Furthermore, some syntax elements related to the transform tree such as max RQT depth for the INTER mode, max RQT depth for the INTRA mode, max TU size and min TU size have to be sent in the sequence-level (SPS) header. Accordingly it is desirable to develop a TU presentation scheme that will result in reduced complexity. Also, the current computation associated with selecting the best merge candidate for the 2N×2N CU merge mode is rather intensive. Therefore, it is desirable to reduce the computational complexity for selecting the best merge candidate for the 2N×2N CU merge mode.

SUMMARY

A method and apparatus for processing transform unit of video data are disclosed. According to the present invention, the method and apparatus for processing transform unit of video data comprise steps of receiving a coding unit of video data, partitioning the coding unit into one or more prediction units (PU) according to 2N×2N, 2N×N, N×2N or N×N partition type, and partitioning the coding unit into one or more transform units depending on the size of coding unit and the size of said one or more prediction units. In one embodiment according to the present invention, the size of transform unit equals to the minimum of PU width and PU height except for a 2N×2N coding unit with the 2N×2N partition type; the size of the transform unit for the 2N×2N partition type is selected between 2N×2N and N×N. In another embodiment according to the present invention, the maximum size of transform unit equals to the maximum of PU width and PU height, and minimum size of the transform unit equals to the minimum of the PU width and the PU height, except for a 2N×2N coding unit with the 2N×2N partition type; the size of the transform unit for the 2N×2N partition type is selected between 2N×2N and N×N In yet another embodiment according to the present invention, the size of the transform unit is selected between 2N×2N and N×N for the 2N×2N, 2N×N, N×2N and N×N partition types. The split_transform_flag syntax element may be incorporated for some conditions to indicate whether transform unit uses 2N×2N or N×N.

A method and apparatus for decoding of video bitstream having transform unit size dependent on prediction unit size are disclosed. According to the present invention, the method and apparatus for decoding of video bitstream having transform unit size dependent on prediction unit size comprise steps of receiving coded data associated with a coding unit in a video bitstream, determining size of the coding unit from the coded data associated with the coding unit, determining PU (prediction unit) partition among 2N×2N, 2N×N, N×2N and N×N partition types associated with the coding unit, determining whether split_transform_flag syntax element exists in the coded data according to the size of the coding unit and the partition type, determining value of split_transform_flag if the split_transform_flag syntax element exists, and determining transform unit partition associated with the coding unit according to the size of the coding unit, the partition type, and the value of the split_transform_flag. In one embodiment according to the present invention, the split_transform_flag syntax element exists if the size of the coding unit is 2N×2N and the 2N×2N partition type is used. In another embodiment according to the present invention, the split_transform_flag syntax element exists if the size of the coding unit is 2N×2N and the 2N×2N, 2N×N or N×2N partition type is used. In yet another embodiment according to the present invention, the split_transform_flag syntax element exists if the size of the coding unit is 2N×2N and the partition type is 2N×2N, 2N×N, N×2N or N×N. The split_transform_flag indicates whether the transform unit partition is 2N×2N or N×N.

A method and apparatus for determining merge candidate for 2N×2N coding unit using reduced encoding computational complexity are disclosed. According to the present invention, the method and apparatus for determining merge candidate for 2N×2N coding unit using reduced encoding computational complexity comprise steps of receiving a motion vector for each of merge candidates associated with a 2N×2N coding unit, performing motion compensation on said each of merge candidates using the motion vector to derive residual signal for said each of merge candidates, calculating motion estimation cost associated with the residual signal and the motion vector, and determining a best merge candidate among the merge candidates, where the best merge candidate causes a smallest motion estimation cost. In one embodiment according to the present invention, the method and apparatus further comprises partitioning the best merge candidate into one or more transform units using residual quad tree, encoding coefficients of said one or more transform units according to a scan pattern, calculating a first R-D cost corresponding to MERGE mode related to bit rate and distortion associated with the coefficients encoded for the best merge candidate, and determining a mode for the coding unit by selecting a smallest R-D cost among the first R-D cost and other R-D costs associated with other modes.

BRIEF DESCRIPTION OF DRAWINGS

FIGS. 2A-2B illustrate syntax for Residual Quad Tree (RQT) partitioning, transform_tree( ), according to a conventional approach of High Efficiency Video Coding (HEVC).

FIGS. 3A-3B illustrate exemplary syntax for Residual Quad Tree (RQT) partitioning, transform_tree( ), according to one embodiment of the present invention.

FIG. 4 illustrates exemplary syntax for Residual Quad Tree (RQT) partitioning, transform_tree( ), according to another embodiment of the present invention.

DETAILED DESCRIPTION

Figure 1:
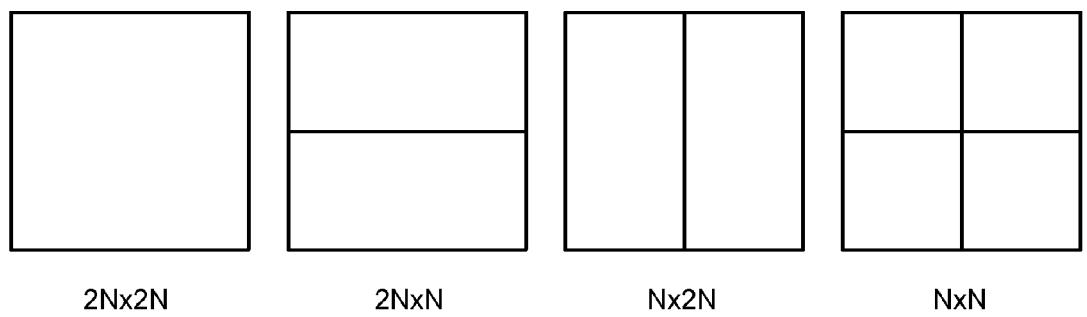
FIG. 1 illustrates various partition types for partitioning a 2N×2N coding unit into one or more prediction units.

High Efficiency Video Coding (HEVC) is a video coding standard under development with the goal to achieve additional 50% bit-rate reduction over the existing H.264/AVC standard. HEVC is block-based hybrid video coding with very flexible block structure. Three block concepts are introduced in HEVC: coding unit (CU), prediction unit (PU), and transform unit (TU). The overall coding structure is characterized by the various sizes of CU, PU and TU in a recursive fashion, where each picture is divided into largest CUs (LCUs) consisting of 64×64 pixels each. Each LCU is then recursively divided into smaller CUs until leaf CUs or smallest CUs are reached. Once the CU hierarchical tree is done, each leaf CU is subject to further split into prediction units (PUs) according to partition type. Furthermore, transform is applied to TUs to transform spatial data into transform coefficients for compact data representation.

In the HEVC development, a HEVC common test model (HM) is being used among developers to evaluate the performance of any proposed algorithm. Up to HM version 1.0, a 2N×2N CU may have PUs with partition sizes 2N×2N and N×N for an INTRA coded frame or slice, and a 2N×2N CU may have PUs with partition sizes 2N×2N, N×2N, 2N×N and N×N for an INTER coded frame or slice as shown in FIG. 1. In the $4^{th}$ JCT-VC (Joint Collaborative Team on Video Coding) meeting in Daegu, Korea, it was decided that the N×N partition type is removed from all CUs which are greater than the Smallest CU (SCU, currently defined as 8×8) for both INTER and INTRA coded frames and slices.

For transform processing in current HEVC, a hierarchy RQT (Residual Quad Tree) is used and the TU size is constrained by the CU size, max RQT depth, max TU size and min TU size. The TU size is independent of the PU size. The maximum TU size is constrained to 32×32, and the minimum TU size is constrained to 4×4. In addition, a TU cannot be larger than the CU that the transform will be applied to. However a TU can span across a PU. For example, for a 32×32 CU, the TU can be 32×32, 16×16 and 8×8, regardless of the PU partition type. The current TU syntax for Residual Quad Tree (RQT), transform_tree( ) in HEVC is shown in FIGS. 2A-B. The max RQT depth allowed in the HM version 2.0 is shown in Table 1:

TABLE 1

|  | High Efficient | Low Complexity |
|---|---|---|
| INTER | 3 | 3 |
| INTRA | 3 | 3 |

Since the TU partition is independent of the PU partition and the maximum depth, i.e., max RQT depth, allowed is 3, the current syntax for Residual Quad Tree, transform_tree( ), is quite complicated. This results in high encoding complexity and also increases time for processing the syntax of residual quad tree. Furthermore, some syntax elements related to the transform tree such as max RQT depth for the INTER mode, max RQT depth for the INTRA mode, max TU size and min TU size have to be sent in the sequence-level (SPS) header as shown in Table 2. Accordingly it is desirable to develop a TU presentation scheme that will result in reduced complexity.

TABLE 2

| log2_min_transform_block_size_minus2 | ue(v) |
|---|---|
| log2_diff_max_min_transform_block_size | ue(v) |
| max_transform_hierarchy_depth_inter | ue(v) |
| max_transform_hierarchy_depth_intra | ue(v) |

In first embodiment according to the present invention, the maximum width and height of a TU equals to the minimum (PU_width, PU_height) except for a 2N×2N coding unit with the 2N×2N partition type. Since a TU is always square, the maximum width and the maximum height of a TU are the same. According to this TU presentation scheme, for a 2N×2N CU and a PU partition type of N×2N, 2N×N or N×N, the TU used to transform the CU will be N×N. For a 2N×2N CU with 2N×2N partition type, the TU size can be either 2N×2N or N×N and the selection can be signaled by "split_transform_flag". In order to incorporate the present invention, the transform tree syntax has to be modified. An example of transform tree syntax embodying the present invention is shown in FIGS. 3A-B. In FIG. 3A, the syntax section 310 that remains the same as the syntax section in the original syntax of FIG. 2A is omitted in FIG. 3A. When residualDataPresentFlag indicates the presence of residual data, split_transform_flag is set to 1. The transform tree processing continues to check whether the transform depth, trafoDepth, is 0 and whether PU partition mode, PartMode, is PART_2N×2N as shown in syntax section 320 in FIG. 3A. If both conditions are true, syntax element split_transform_flag is incorporated. If either condition is false, the process further tests second sets of conditions regarding whether trafoDepth is 0 and whether split_transform_flag is set as shown in syntax section 330 in FIG. 3A The coding performance of a system embodying the modified TU presentation scheme according to the present invention is compared with the reference test model HM version 2.0. The performance in terms of BD-rate for YUV components are compared using simulation based on a set of standard test data, named Class A through Class E as shown in Table 3A for INTRA prediction, in Table 3B for Random Access setting and in Table 3C for Low Delay setting. Furthermore, the simulation systems used to compare the performance are configured for High Efficiency (HE) operation. In the tables, a positive RD-rate value indicates a loss of coding efficiency.

TABLE 3A

| | Intra | | |
|---|---|---|---|
| | Y BD-rate | U BD-rate | V BD-rate |
| Class A | 0.1 | 0.0 | 0.1 |
| Class B | 0.1 | 0.0 | 0.1 |
| Class C | 0.1 | 0.2 | 0.2 |
| Class D | 0.1 | 0.1 | 0.1 |
| Class E | 0.2 | 0.6 | 0.3 |
| All | 0.1 | 0.2 | 0.1 |
| Enc Time [%] | | 96% | |
| Dec Time [%] | | 100% | |

TABLE 3B

| | Random Access | | |
|---|---|---|---|
| | Y BD-rate | U BD-rate | V BD-rate |
| Class A | 0.4 | 0.4 | 0.0 |
| Class B | 0.4 | 0.3 | 0.1 |
| Class C | 0.4 | 0.4 | 0.2 |
| Class D | 0.2 | 0.2 | 0.1 |
| Class E | 0.0 | 0.0 | 0.0 |
| All | 0.4 | 0.3 | 0.1 |
| Enc Time [%] | | 89% | |
| Dec Time [%] | | 101% | |

TABLE 3C

| | Low Delay | | |
|---|---|---|---|
| | Y BD-rate | U BD-rate | V BD-rate |
| Class A | 0.0 | 0.0 | 0.0 |
| Class B | 0.5 | 0.8 | 1.0 |
| Class C | 0.4 | 0.0 | 0.3 |
| Class D | 0.3 | 1.0 | 0.2 |
| Class E | 0.2 | 0.9 | 1.0 |
| All | 0.4 | 0.7 | 0.6 |
| Enc Time [%] | | 90% | |
| Dec Time [%] | | 100% | |

The RD-rates shown in Tables 3A-C indicate a small loss of coding efficiency caused by the modified TU presentation scheme. However, noticeable reduction in encoding time is achieved by the modified TU presentation scheme. Therefore, the modified TU presentation scheme demonstrates a good performance-complexity tradeoff.

In second embodiment according to the present invention, the maximum width and height of a TU equals to the maximum (PU_width, PU_height) and the minimum width and height of a TU equals to the minimum (PU_width, PU_height) except for a 2N×2N CU with 2N×2N, N×2N or 2N×N partition types. However, for the 2N×2N CU with 2N×2N partition types, TU can be either 2N×2N or N×N and the selection of TU size is indicated by split_transform_flag. If N×N PU size is allowed and selected, there is no need to send split_transform_flag. In order to incorporate the present invention, the transform tree syntax has to be modified. An example of transform tree syntax embodying the present invention is shown in FIG. 4. The syntax sections that are the same as the original syntax sections in FIGS. 2A-B are omitted. When residualDataPresentFlag indicates the presence of residual data, split_transform_flag is set to 1 as shown in syntax section 410 in FIG. 4. The conditions regarding whether transform depth is 0 and whether the PU partition mode is not N×N as shown in syntax section 420.

The coding performance of a system embodying the modified TU presentation scheme according to the present invention is also compared with the reference test model HM version 2.0. The performance in terms of BD-rate for YUV components are compared using simulation based on a set of standard test data, named Class A through Class E as shown in Table 4A for INTRA prediction, in Table 4B for Random Access setting and in Table 4C for Low Delay setting. Furthermore, the simulation systems used to compare the performance are configured for High Efficiency operation. In the tables, a positive RD-rate value indicates a loss of coding efficiency.

TABLE 4A

| | Intra | | |
|---|---|---|---|
| | Y BD-rate | U BD-rate | V BD-rate |
| Class A | 0.1 | 0.0 | 0.1 |
| Class B | 0.1 | 0.0 | 0.1 |
| Class C | 0.1 | 0.2 | 0.2 |
| Class D | 0.1 | 0.1 | 0.1 |
| Class E | 0.2 | 0.6 | 0.3 |
| All | 0.1 | 0.2 | 0.1 |
| Enc Time [%] | | 96% | |
| Dec Time [%] | | 100% | |

TABLE 4B

| | Random Access | | |
|---|---|---|---|
| | Y BD-rate | U BD-rate | V BD-rate |
| Class A | 0.2 | 0.5 | 0.2 |
| Class B | 0.2 | 0.4 | 0.1 |
| Class C | 0.3 | 0.4 | 0.2 |
| Class D | 0.1 | 0.4 | 0.1 |
| Class E | 0.0 | 0.0 | 0.0 |
| All | 0.2 | 0.4 | 0.1 |
| Enc Time [%] | | 92% | |
| Dec Time [%] | | 101% | |

TABLE 4C

| | Low Delay | | |
|---|---|---|---|
| | Y BD-rate | U BD-rate | V BD-rate |
| Class A | 0.0 | 0.0 | 0.0 |
| Class B | 0.3 | 0.5 | 0.4 |
| Class C | 0.2 | −0.3 | 0.2 |
| Class D | 0.2 | 1.2 | 0.4 |
| Class E | −0.1 | −0.3 | 0.9 |
| All | 0.2 | 0.4 | 0.5 |
| Enc Time [%] | | 93% | |
| Dec Time [%] | | 100% | |

The RD-rates shown in Tables 4A-C indicate a small loss of coding efficiency caused by the modified TU presentation scheme. However, noticeable reduction in encoding time is achieved by the modified TU presentation scheme. Therefore, the modified TU presentation scheme demonstrates a good performance-complexity tradeoff.

In third embodiment according to the present invention, the TU depth is less than the maximum allowed depth for both INTER and INTRA prediction modes. For example, while the maximum allowed TU depth is 3 in HM version 2.0, an embodiment according to the present invention may limit the TU depth to 2. In the case that the TU depth is limited to 2, the transform size can be 2N×2N or N×N with the constraint of maximum TU size 32×32.

The coding performance of a system incorporating the third embodiment of the modified TU presentation scheme is also compared with the reference test model HM version 2.0. The performance in terms of BD-rate for YUV components are compared using simulation based on a set of standard test data, named Class A through Class E as shown in Table 5A for INTRA prediction, in Table 5B for Random Access setting and in Table 5C for Low Delay setting. Furthermore, the simulation systems used to compare the performance are configured for High Efficiency operation. In the above tables, a positive RD-rate value indicates a loss of coding efficiency.

TABLE 5A

| inter = 2 intra = 2 | Intra | | |
|---|---|---|---|
| | Y BD-rate | U BD-rate | V BD-rate |
| Class A | 0.1 | 0.1 | 0.1 |
| Class B | 0.1 | 0 | 0 |
| Class C | 0.1 | 0.2 | 0.2 |
| Class D | 0.1 | 0.1 | 0 |
| Class E | 0.2 | 0.5 | 0.4 |
| All | 0.1 | 0.1 | 0.1 |
| Enc Time [%] | | 95% | |
| Dec Time [%] | | 100% | |

TABLE 5B

| | Random Access | | |
|---|---|---|---|
| | Y BD-rate | U BD-rate | V BD-rate |
| Class A | 0.3 | 0.2 | 0 |
| Class B | 0.3 | 0.3 | 0.1 |
| Class C | 0.3 | 0.4 | 0.3 |
| Class D | 0.1 | 0.2 | 0.3 |
| Class E | 0 | 0 | 0 |
| All | 0.3 | 0.3 | 0.2 |
| Enc Time [%] | | 90% | |
| Dec Time [%] | | 101% | |

TABLE 5C

| | Low Delay | | |
|---|---|---|---|
| | Y BD-rate | U BD-rate | V BD-rate |
| Class A | 0 | 0 | 0 |
| Class B | 0.3 | 0.6 | 0.3 |
| Class C | 0.2 | -0.2 | 0.3 |
| Class D | 0.2 | 0.7 | 0.2 |
| Class E | -0.3 | -0.9 | 0.2 |
| All | 0.1 | 0.2 | 0.3 |
| Enc Time [%] | | 92% | |
| Dec Time [%] | | 100% | |

The RD-rates shown in Tables 5A-C indicate a small loss of coding efficiency caused by the modified TU presentation scheme. However, noticeable reduction in encoding time is achieved by the modified TU presentation scheme. Therefore, the modified TU presentation scheme demonstrates a good performance-complexity tradeoff.

In HM version 2.0 for HEVC, a high complexity Rate-Distortion Optimization (RDO) is used for mode decision for 2N×2N CU merge modes. The RDO process consists of the following steps:

1. Motion compensation using merge candidate's motion vector;
2. Hierarchy transform using the Residual Quad-Tree (RQT);
3. Scan and encode the coefficients;
4. Calculate the R-D cost using the bit-rate and distortion:

$$J_{mode}=SSD(MV)+\lambda_{mode}*(R(MV)),$$

where MV is the motion vector for the merge candidate;
R is the bit-rate for coding the 2N×2N CU using the merge candidate; and
SSD (Sum of Squared Difference) is the distortion measurement.

5. Choose the best merge candidate having the lowest R-D cost;
6. Compare the R-D cost with other modes (SKIP, INTER and INTRA) and choose the best mode the lowest R-D cost.

The number of merge candidates is up to 5 in the current HEVC software, HM version 2.0. For 2N×2N CU merge, the RD-cost for every merge candidate is fully calculated (i.e. the rate and distortion is calculated by performing encoding process including transform, quantization and entropy coding) in order to determine the best merge candidate (merge index). For N×2N CU or 2N×N CU merge, fast estimation is used to decide the merge index where the actual RD-cost (from full encoding) is only calculated once for the selected merge candidate.

In fourth embodiment according to the present invention, a method for reducing the computational complexity of encoding by simplifying the R-D optimization. According to the fourth embodiment of the presentation, the cost computations associated with RD-optimization for selecting the best merge candidate for the 2N×2N CU merge mode is based on estimation. An example to implement the simplified the R-D optimization method is shown in the following steps:

1. Motion compensation using merge candidate's motion vector for each merge candidate;
2. Compute motion estimation costs;

$$J_{motion}=SAD(MV)+\lambda_{motion}*(R(MV)),$$

where MV is the motion vector for the merge candidate;
R is the bit-rate for coding the MV using the merge candidate; and
SAD (Sum of Absolute Difference) is the distortion measurement.

3. Choose the best merge candidate with the lowest motion estimation cost;
4. Hierarchy transform using the RQT for the best merge candidate;
5. Scan and encode the coefficients for the best merge candidate;
6. Calculate the bit-rate and distortion for the best merge candidate; and
7. Compare the R-D cost with other modes (SKIP, INTER and INTRA) and choose the best mode the lowest R-D cost.

As shown in the above steps, the motion estimation cost associated with motion vector of each merge candidate is computed instead of the R-D cost as in the conventional approach. The motion estimation cost is used to select a best merge candidate and the full R-D cost is only performed for the best merge candidate. Computations for the motion estimation cost are much lower than computations for the R-D cost. Consequently, computational complexity for selecting the best merge candidate according to the fourth embodiment is reduced.

The coding performance of a system incorporating an embodiment of the simplified R-D optimization is compared with the reference test model HM version 2.0. The performance in terms of BD-rate for YUV components are compared using simulation based on a set of standard test data, named Class A through Class E as shown in Table 6A for Random Access setting and in Table 6B for Low Delay setting. Furthermore, the simulation systems used to compare the performance are configured for High Efficiency operation. In the tables, a positive RD-rate value indicates a loss of coding efficiency. As shown in Tables 6A-B, the average saving in overall encoding time is about 6-7% with 0.2-0.3% BD-rate increase over the HEVC HM version 2.0 configured for High Efficiency.

TABLE 6A

Random Access

|  | Y BD-rate | U BD-rate | V BD-rate |
| --- | --- | --- | --- |
| Class A | 0.1 | −0.1 | −0.1 |
| Class B | 0.3 | 0.3 | 0.3 |
| Class C | 0.2 | 0.5 | 0.3 |
| Class D | 0.0 | 0.1 | 0.3 |
| Class E | 0.0 | 0.0 | 0.0 |
| All | 0.2 | 0.3 | 0.2 |
| Enc Time [%] |  | 93% |  |
| Dec Time [%] |  | 101% |  |

TABLE 6B

Low Delay

|  | Y BD-rate | U BD-rate | V BD-rate |
| --- | --- | --- | --- |
| Class A | 0.0 | 0.0 | 0.0 |
| Class B | 0.5 | 0.0 | 0.0 |
| Class C | 0.3 | −0.1 | 0.2 |
| Class D | 0.3 | 0.1 | −0.4 |
| Class E | 0.1 | −0.4 | −0.1 |
| All | 0.3 | −0.1 | −0.1 |
| Enc Time [%] |  | 94% |  |
| Dec Time [%] |  | 100% |  |

To practice the first, the second and the third embodiments of the present invention, the syntax element, split_transform_flag, is incorporated in the coded video bitstream so that a decoder embodying the present invention can properly decode the video bitstream. For example, the decoder can derive the size of the coding unit and the partition type from the coded video data for a coding unit. Based on the size of the coding unit and the partition type, the decoder can determine whether split_transform_flag exists. When split_transform_flag exists, split_transform_flag is used to determine the transform unit partition. Otherwise, the transform unit partition is determined according to respective rules of various embodiments. Furthermore, the first, the second and the third embodiments of the present invention eliminate the need for incorporating some transform tree related syntax elements including max RQT depth for the INTER mode, max RQT depth for the INTRA mode, max TU size and min TU size in the sequence-level (SPS) header. With respect to fourth embodiment according to the present invention, it only affects the process of selecting the best merge candidate in the encoder.

In the disclosure herein, several embodiments of modified TU presentation scheme with reduced computational complexity are described where the TU size is related to PU size except for a 2N×2N coding unit with the 2N×2N partition type. According to the first embodiment of the present invention, the size of transform unit equals to the minimum (PU_width, PU_height) except for a 2N×2N coding unit with the 2N×2N partition type. According to the second embodiment of the present invention, the maximum size of transform unit equals to the maximum (PU_width, PU_height), and minimum size of the transform unit equals to the minimum (PU_width, PU_height), except for a 2N×2N coding unit with the 2N×2N partition type. According to the third embodiment of the present invention, the size of the transform unit is selected between 2N×2N and N×N for the 2N×2N, 2N×N, N×2N and N×N partition types. According to the fourth embodiment of the present invention, a method for reducing the computational complexity of encoding by simplifying the R-D optimization is disclosed. Embodiments of video systems incorporating encoding or decoding of modified TU presentation scheme with reduced computational complexity according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of processing transform unit of video data, the method comprising:
   receiving a coding unit of video data;
   partitioning the coding unit into one or more prediction units (PUs) according to 2N×2N, 2N×N, N×2N or N×N partition type, wherein a prediction mode for prediction processing of said one or more prediction units is determined for each of said one or more prediction units;

generating residues of the coding unit according to said one or more prediction units for the coding unit; and partitioning the residues of the coding unit into one or more transform units by prohibiting the transform units from crossing any PU boundary corresponding to the PUs having different sizes from the transform units, wherein the size of said one or more transform units is square and the size of said one or more transform units depends on both sizes of the coding unit and said one or more prediction units, wherein a maximum width and a maximum height of said one or more transform units is equal to a minimum of PU width and PU height for a 2N×2N coding unit with the 2N×N, N×2N or N×N partition type.

2. The method of claim 1, wherein width and height of said one or more transform units for the 2N×2N coding unit with the 2N×2N partition type is either 2N×2N or N×N.

3. The method of claim 2, wherein a syntax element is used for the 2N×2N coding unit with the 2N×2N partition type to indicate a selection between 2N×2N and N×N for the width and height of said one or more transform units.

4. The method of claim 3, wherein the syntax element is omitted for the 2N×2N coding unit with the 2N×N, N×2N or N×N partition type, and the width and height of said one or more transform units is inferred to be N×N.

5. The method of claim 1, wherein the size of said one or more transform units is selected between 2N×2N and N×N for the 2N×2N, 2N×N, N×2N and N×N partition types.

6. The method of claim 5, wherein a syntax element is used to indicate the size of said one or more transform units selected.

7. A method of decoding of video bitstream having transform unit size dependent on prediction unit size, the method comprising:

receiving coded data associated with a coding unit in a video bitstream;

determining size of the coding unit from the coded data associated with the coding unit;

determining PU (prediction unit) partition among 2N×2N, 2N×N, N×2N and N×N partition types associated with the coding unit; and determining the transform unit partition associated with the coding unit according to the size of the coding unit and the partition type, wherein the size of said one or more transform units is square, wherein a maximum width and a maximum height of one or more transform units resulted from the transform unit partition is equal to a minimum of PU width and PU height for a 2N×2N coding unit with the 2N×N, N×2N or N×N partition type, and wherein the transform units do not cross any PU boundary, even when the PUs having different sizes from the transform units.

8. The method of claim 7, wherein a syntax element exists if the size of the coding unit is 2N×2N and the 2N×2N partition type is used, and wherein the syntax element indicates whether the transform unit partition is 2N×2N or N×N.

9. The method of claim 8, wherein the syntax element for indicating whether the transform unit partition is 2N×2N or N×N is omitted if the size of the coding unit is 2N×2N and the partition type is N×2N, 2N×N or N×N.

10. The method of claim 7, wherein the syntax element exists if the size of the coding unit is 2N×2N and the partition type is 2N×2N, 2N×N, N×2N or N×N, and wherein the syntax element indicates whether the transform unit partition is 2N×2N or N×N.

11. The method of claim 1, wherein no syntax of the size of said one or more transform units is incorporated in a video bitstream for the 2N×2N coding unit with the 2N×N, N×2N and N×N partition types.

12. The method of claim 7, wherein no syntax of the size of said one or more transform units is incorporated in a video bitstream for the 2N×2N coding unit with the 2N×N, N×2N and N×N partition types.

* * * * *